June 18, 1974 — YU K. PEI — 3,817,732

METHOD OF MAKING GLASS-CERAMIC PUMP PARTS

Original Filed Oct. 12, 1970 — 2 Sheets-Sheet 1

INVENTOR.
Y. K. PEI
BY E. F. DWYER
E. J. HOLLER
ATTORNEYS

June 18, 1974 YU K. PEI 3,817,732
METHOD OF MAKING GLASS-CERAMIC PUMP PARTS
Original Filed Oct. 12, 1970 2 Sheets-Sheet 2

INVENTOR.
Y. K. PEI
BY E. F. DWYER
E. J. HOLLER
ATTORNEYS

United States Patent Office 3,817,732
Patented June 18, 1974

3,817,732
METHOD OF MAKING GLASS-CERAMIC PUMP PARTS
Yu K. Pei, Toledo, Ohio, assignor to Owens-Illinois, Inc.
Continuation of application Ser. No. 80,111, Oct. 12, 1970, which is a continuation-in-part of application Ser. No. 78,476, Oct. 6, 1970, both now abandoned. This application Apr. 16, 1973, Ser. No. 351,457
Int. Cl. C03b 19/00, 29/00
U.S. Cl. 65—33    1 Claim

ABSTRACT OF THE DISCLOSURE

This invention is a method of press-forming thermally-crystallizable glass material, having a high viscosity characteristic, into pump parts wherein the material is heated to a molten state and press-formed into pump parts having intricate water-way designs and a solid discharge nozzle; and a coring operation that completes a passage in the discharge nozzle. The glass is then heated and crystallized to a ceramic state, known as a glass ceramic.

CROSS-REFERENCE TO RELATED APPLICATION

This application is a continuation of application Ser. No. 80,111, filed Oct. 12, 1970, now abandoned, which was a continuation-in-part of application Ser. No. 78,476, filed Oct. 6, 1970, now abandoned.

BACKGROUND OF THE INVENTION

Field of the invention

This invention relates to a method of forming pump parts from a thermally crystallizable glass material by press-forming. Glass ceramic material is most desirable for pump parts because of its characteristics, which include a high resistance to acid etching and a very low coefficient of thermal expansion; however, the viscosity characteristics of thermally crystallizable glass materials make it impractical to cast parts in sand molds.

Description of the prior art

Pump parts of non-ceramic material have been cast in sand molds. This sand mold casting involved the pouring of a molten material into a mold made in a mirror image of the part, and allowing the molten material to cool. However, the high viscosity of ceramic materials make it difficult to form intricate designs.

This invention is a method of forming pump parts from a thermally crystallizable glass, using a press-forming operation.

In this method, the thermally crystallizable glass is pressed to form a pump casing, including the discharge nozzle of the pump.

The formed pump casing is then cored to form a discharge for the water-way.

SUMMARY OF THE INVENTION

It is desirable to make pumps from glass ceramic materials because they have desirable physical characteristics including high thermal shock resistance, a low coefficient of thermal expansion and a high resistance to acid-etching; however, it is difficult to form intricate designs, especially a nozzle.

This invention is a method of forming pump parts from a thermally crystallizable glass, using a press-forming operation. Most glass-ceramics have a low coefficient of thermal expansion and possess adequate tensile strength, but have a high viscosity index at melting temperatures; therefore, the material is not suitable for a casting process. The method of this invention permits the forming of the high viscosity molten material, especially glasses having a viscosity of $10^4$ poises at temperatures below 2000° F.

In this method, the intricate water-way, whether it is a single or multiple path, can be pressed into the casing and also form the discharge nozzle of the ceramic pump.

The formed casing is then cored to form a discharge water-way. The glass is then crystallized by heating.

DESCRIPTION OF THE PREFERRED EMBODIMENT

Figure 1:
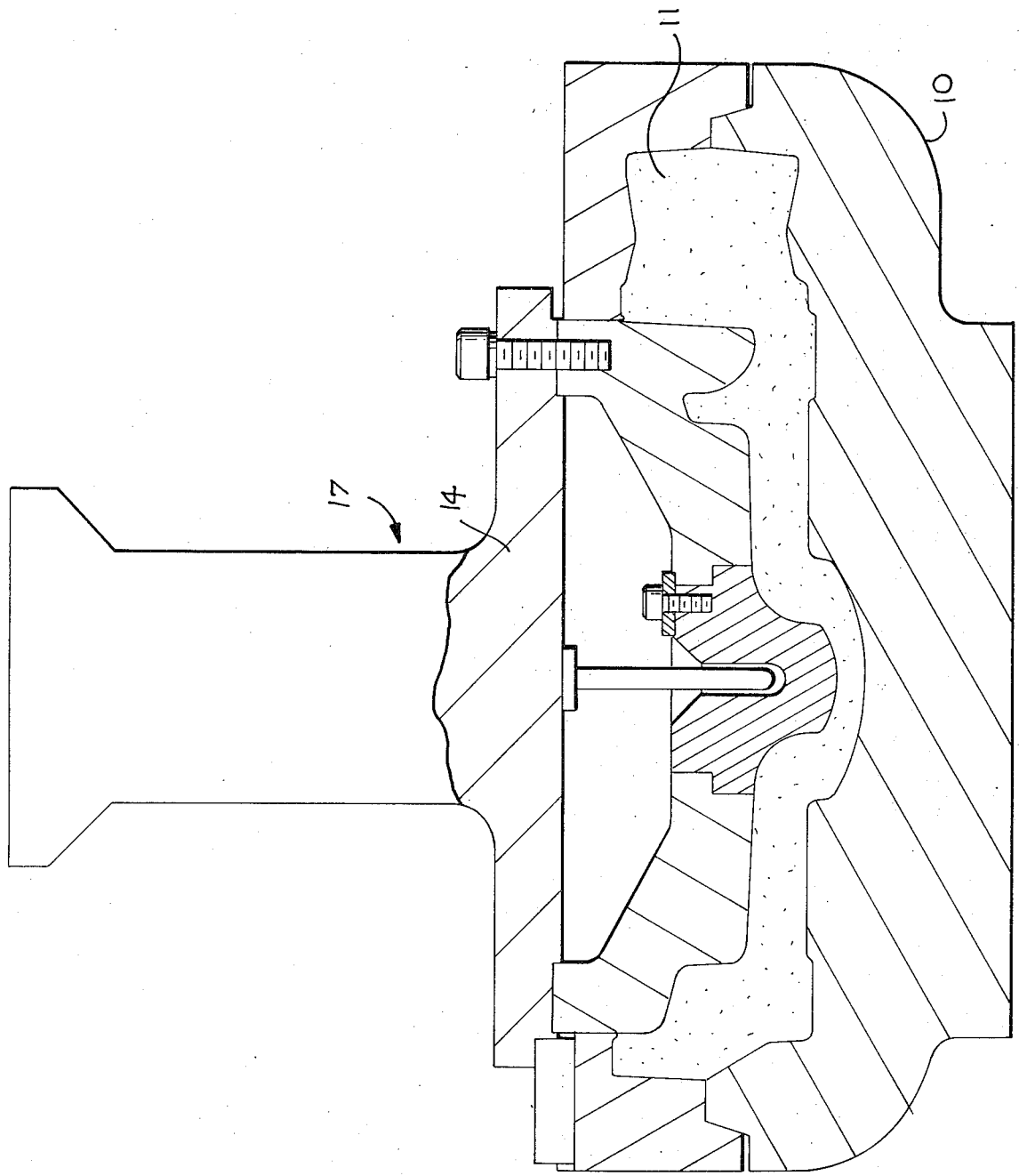
FIG. 1 is a side sectional view of a mold and a pump casing being formed by the contours of the mold.

Referring to the drawings, FIG. 1 shows a mold and a pump casing being formed of a thermally crystallizable glass of high viscosity. The casing is circular in configuration and has a hollow portion for housing an impeller and a water-way which has a semi-circular configuration, and which runs around the outer periphery of the casing.

Referring to the drawings, FIG. 1 shows a mold 10, a pump casing 11 being formed in the mold. The casing is a glass ceramic material formed of a heat-crystallizable glass of a high viscosity. The casing 11 is circular in configuration and has a hollow portion 13 housing an impeller; a water-way 14 having a semi-circular configuration, occupies an area around the outer periphery of the casing. A discharge nozzle 15 is formed of solid material. A water passage, shown by dotted lines 16, is opened by a subsequent coring operation. In the coring operation, it is necessary to use a diamond-tipped drill, which is water lubricated and then cooled. Referring again to FIG. 1, a ram 17 has the shape of the inner configuration of the casing.

Figure 3:
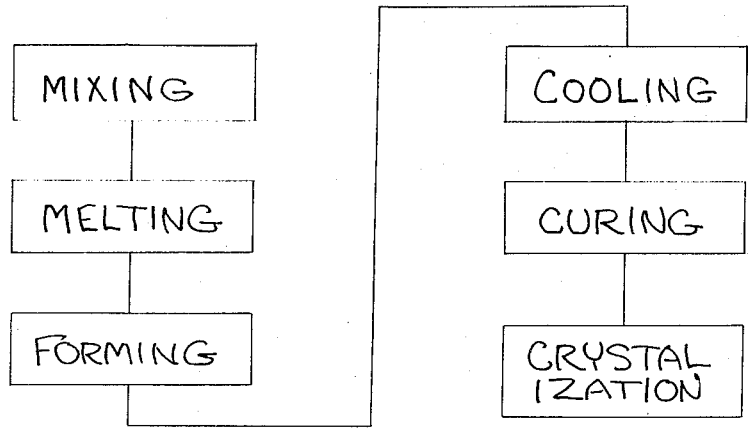
FIG. 3 is a block diagram of the method.

A complete description of the steps of the method of this invention may be had when the following description is read in conjunction with the FIG. 3 of the drawing.

Thermally crystallizable glass compounds and methods of crystallizing glass ceramics, therefor, are disclosed in U.S. Patent Application, Ser. #630,507, filed Apr. 13, 1967, to Petticrew, Richard W.; and subsequently disclosed in the corresponding streamlined continuation application, Ser. #866,168, filed Oct. 13, 1969. The above-identified application is now U.S. Pat. No. 3,625,718.

A typical example of a heat-crystallizable glass composition is the following, having this composition in parts by weight as follows:

EXAMPLE I

| | |
|---|---|
| $SiO_2$ | 70.6 |
| $Al_2O_3$ | 19.8 |
| $Li_2O$ | 3.7 |
| $ZnO$ | 1.7 |
| $TiO_2$ | 1.9 |
| $ZrO_2$ | 1.5 |
| $Na_2O$ | 0.5 |
| $K_2O$ | 0.1 |
| F | 0.1 |

Figure 2:
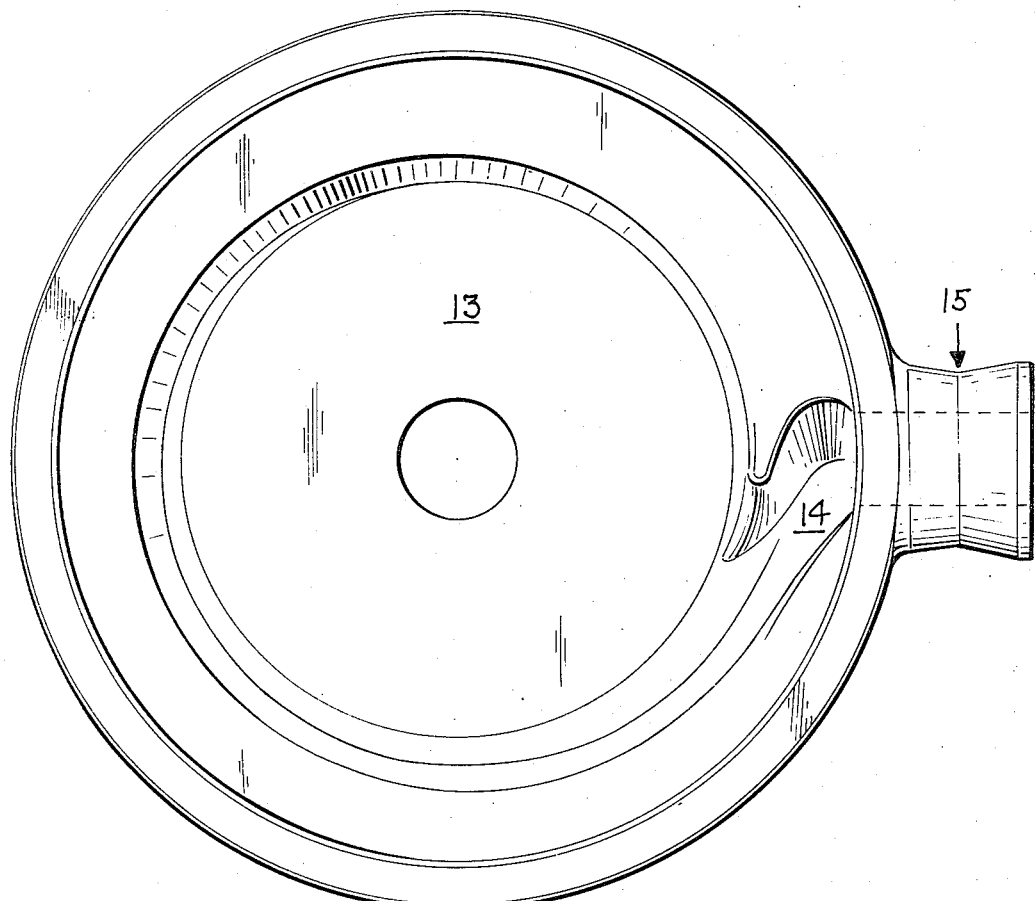
FIG. 2 is a top view of a casing.

The mixed ingredients are then heated in a suitable gas or electric furnace and brought to the liquid state which is approximately 3000° F., a gob of molten thermally-crystallizable glass is then transferred to the mold 10. This process is known as hand-gobbing. In other methods, the molten material may be transferred mechanically, directly from the mixing vessel to the mold. The mold is preferably made from a cast iron or stainless steel material lined with a graphite-releasing coating. The molded part is allowed to cool in the mold to room temperature and is then removed. At this time, the coring operation is performed, forming the discharge opening, as shown in FIG. 2. Parts of the molded piece are then machined to provide a desirable, smooth surface for mating with the casing cover and also with a piping system leading from the discharge outlet. The formed and machined part is then placed in an oven and heated to a final temperature of about 2000° F., in accordance with a heating schedule as disclosed in application, Ser. #866,168.

The formed pump part is placed in an oven and heated to a final temperature of about 2000° F. The heat treatment is that described in the above disclosed Petticrew applications 630,507 et al., wherein the formed heat-crystallizable glass is heated from room temperature at approximately 50° per hour to about 1350° C. A holding period follows for about 16 hours; thereafter, the temperature is raised at about 10° per hour to about 1450° C. Subsequently, at 150° per hour, go to 1950° C. Then at 50° per hour to about 2000° where the temperature is held for approximately 1¾ hours. The formed material is then cooled down at about 300° per hour. The heating schedule varies with the composition of the heat-crystallizable glass. This schedule is for Example I herein. The glass has a log$^4$ viscosity at temperatures below about 2490° F. Other examples of heat-crystallizable glass compositions are shown in Table II.

TABLE II
Composition, parts by weight, and glass properties

|  | 1 | 2 | 3 | 4 | 5 | 6 | 7 |
|---|---|---|---|---|---|---|---|
| SiO$_2$ | 70.6 | 70.2 | 69.2 | 69.4 | 68.5 | 69 | 68.2 |
| Al$_2$O$_3$ | 19.8 | 17 | 17 | 16.9 | 19.1 | 19.6 | 19.4 |
| Li$_2$O | 3.7 | 3.9 | 3.5 | 3.5 | 3.5 | 3.8 | 3.8 |
| ZnO | 1.7 | 3.5 | 2.2 | 2.2 | 3.1 | 1.6 | 1.6 |
| TiO$_2$ | 1.9 | 1.8 | 1.8 | 1.8 | 1.8 | 1.8 | 1.8 |
| ZrO$_2$ | 1.5 | 1.4 | 1.4 | 1.4 | 1.4 | 1.4 | 1.4 |
| P$_2$O$_5$ |  | 1.5 | 1.4 | 1.5 | 1.5 | 1.5 | 2.7 |
| MgO |  |  | 2.2 | 2 |  |  |  |
| Na$_2$O | 0.5 | 0.4 | 0.5 | 0.5 | 0.4 | 0.6 | 0.4 |
| K$_2$O | 0.1 | 0.2 | 0.2 | 0.2 | 0.2 | 0.3 | 0.2 |
| Sb$_2$O$_3$ |  | 0.5 | 0.5 | 0.5 | 0.5 | 0.4 | 0.4 |
| F | 0.1 | 0.1 | 0.2 | 0.1 | 0.1 |  |  |
| Cl |  |  |  |  |  |  |  |
| CaO |  |  |  |  |  |  |  |
| AP | 1,260 | 1,150 | 1,245 | 1,240 | 1,225 | 1,225 | 1,250 |
| L$_g$λ=4 | 2,480 | 2,470 | 2,400 | 2,440 | 2,450 | 2,500 | 2,505 |

The explanation of the symbols in Table II is:

AP = Annealing point temperature

L$_g$λ = Temperature at which the logarithm of the glass viscosity in poises is four (4).

What is claimed is:

1. A method of making a pump casing comprising pressing a charge of thermally crystalilzable glass having the following range of compositions:

|  | Wt. percent |
|---|---|
| SiO$_2$ | 68.2–70.6 |
| Al$_2$O$_3$ | 17–19.8 |
| Li$_2$O | 3.5–3.9 |
| ZnO | 1.6–3.1 |
| TiO$_2$ | 1.8–1.9 |
| ZrO$_2$ | 1.4–1.5 |
| P$_2$O$_5$ | 0–2.7 |
| MgO | 0–2.2 |
| Na$_2$O | 0.4–0.6 |
| K$_2$O | 0.1–0.3 |
| Sb$_2$O$_3$ | 0–0.5 |
| F | 0–0.2 | said composition having an annealing point ranging from 1150° C. to 1260° C. and a log viscosity in poises equal to 10$^4$ at temperatures ranging from 2400° F. to 2505° F. against the confines of a mold to form the charge of molten glass into a casing having an imperforate bottom wall and an imperforate peripheral wall defining a hollow chamber, a water discharge way being formed in a portion of said hollow chamber, a solid projection from a peripheral edge of the chamber forming a discharge nozzle extending radially outward from said peripheral wall, (b) cooling said pressed casing to ambient temperature and (c) coring said radial projection to define a radial discharge passage in said nozzle and (d) thereafter subjecting the formed and cored article to a heat treatment to crystallize the glass.

References Cited
UNITED STATES PATENTS

| 2,648,179 | 8/1953 | Manes et al. | 51—283 |
| 3,455,666 | 7/1969 | Bazinet Jr. | 65—61 X |
| 3,113,877 | 12/1963 | Janakirama-rao | 65—33 |
| 3,613,222 | 10/1971 | Richey | 65—61 X |
| 911,809 | 2/1909 | Conradson | 51—283 |
| 3,113,009 | 12/1963 | Brown et al. | 65—33 |

OTHER REFERENCES

Handbook of Glass Manufacture, Fay T. Tooley, pp. 192–199.

FRANK W. MIGA, Primary Examiner

U.S. Cl. X.R.

65—61

PO-1050
(5/69)

UNITED STATES PATENT OFFICE
CERTIFICATE OF CORRECTION

Patent No. 3,817,732    Dated June 18, 1974

Inventor(s) LU K. PEI

It is certified that error appears in the above-identified patent and that said Letters Patent are hereby corrected as shown below:

Col. 4, line 2, after "comprising" add --: (a)--.

Signed and sealed this 3rd day of December 1974.

(SEAL)
Attest:

McCOY M. GIBSON JR.
Attesting Officer

C. MARSHALL DANN
Commissioner of Patents